US008365067B2

(12) United States Patent
Bierbrauer et al.

(10) Patent No.: US 8,365,067 B2
(45) Date of Patent: Jan. 29, 2013

(54) METHOD AND SYSTEM FOR MOVING SINGLE DOCUMENTS BETWEEN A DOCUMENT PROCESSING SYSTEM AND A DOCUMENT REPOSITORY

(75) Inventors: Matthias Stefan Bierbrauer, Stuttgart (DE); Daniel Haenle, Dusseldorf (DE)

(73) Assignee: International Business Machines Corporation, Armonk, NY (US)

( * ) Notice: Subject to any disclaimer, the term of this patent is extended or adjusted under 35 U.S.C. 154(b) by 2999 days.

(21) Appl. No.: 10/020,048

(22) Filed: Dec. 14, 2001

(65) Prior Publication Data

US 2002/0073120 A1    Jun. 13, 2002

(30) Foreign Application Priority Data

Dec. 15, 2000 (EP) .................................. 00127585

(51) Int. Cl.
*G06F 17/00* (2006.01)
(52) U.S. Cl. ........ 715/234; 715/229; 715/242; 715/255; 707/802; 707/804; 707/822
(58) Field of Classification Search .................. 715/513, 715/514, 503, 229, 234, 242, 255; 707/203, 707/205, 802, 804, 822
See application file for complete search history.

(56) References Cited

U.S. PATENT DOCUMENTS

| | | | | |
|---|---|---|---|---|
| 5,903,892 A | * | 5/1999 | Hoffert et al. | 707/10 |
| 6,613,098 B1 | * | 9/2003 | Sorge et al. | 715/503 |
| 6,721,727 B2 | * | 4/2004 | Chau et al. | 707/3 |
| 6,754,677 B1 | * | 6/2004 | Cho et al. | 707/201 |
| 2002/0029228 A1 | * | 3/2002 | Rodriguez et al. | 707/204 |

OTHER PUBLICATIONS

Michael Ball, XSL gives your XML some style; Use XSL and servlets to style your XML data, Jul. 4, 2000, JavaWorld, pp. 1-18.*
Lonnie E. Moseley, Office 97 Professional Edition, Microsoft, Copyright 1997, pp. 503-520.*

* cited by examiner

*Primary Examiner* — Stephen Hong
*Assistant Examiner* — Matthew Ludwig
(74) *Attorney, Agent, or Firm* — Steven M. Greenberg, Esq.; Carey, Rodriguez, Greenberg & O'Keefe

(57) ABSTRACT

From a logical point of view, a document processing system allows to read and write single documents. However, physically all documents within a document processing system are usually stored in a sequential binary format and therefore are not accessible in the binary format. In order to move a single document in its physical representation i.e. the binary format, it is proposed to use the logical view to obtain all structural information describing the document as well as its content and all meta data. This information will then be used to create an exact copy of that document outside the document processing system.
The invention particularly proposes a native file format to write content such as Lotus Domino notes, that is documents as well as design elements like folders, agents, buttons, etc. to a file. The native file format allows to read content of a document in binary format and write it in a serialized manner to the file. Besides the document content, the file format can store document properties as meta data and therefore those properties are preserved during serialization.

16 Claims, 3 Drawing Sheets

METHOD AND SYSTEM FOR MOVING SINGLE DOCUMENTS BETWEEN A DOCUMENT PROCESSING SYSTEM AND A DOCUMENT REPOSITORY

FIELD OF THE INVENTION

The invention relates to data processing environments with large document repositories and, more specifically, to a method and system for moving single documents between a document processing system and a document repository.

BACKGROUND OF THE INVENTION

Known client mailing applications like LotUs™ NoteS™ or Microsoft™ Outlook™, up to now, do not provide a standard way of extracting and moving a single note or mail document out of and into a mail database file. This means that a whole mail database file must always be stored, just to append a single mail item. For this reason, Lotus Notes has already started implementing an XML solution. However, its format as well as its interface are still under evaluation (see http://www.notes.net/sandbox.nsf/ . . . ).

One drawback of the above described XML approach is that an XML data representation of mail or notes does not completely preserve all properties of such documents.

In addition to that, XML is a readable ASCII-based format. That means, if someone did not have access to an original note, but has the XML representation of a note, one can read the note's content e.g. by browsing it in a regular text editor. Further, converting documents to XML and back means a lot of overhead.

Therefore, a mechanism is needed to extract a document, as it is, in some compact format without being able to read the document, if it is protected.

Further, when the document is restored, it must be identical to the original one. That is, besides the content, it must also have the same properties.

SUMMARY OF THE INVENTION

It is therefore an object of the present invention to provide a method and system for moving a document between a document processing system and a document repository in a compact format, without unnecessary overhead.

It is another object to provide a method and system for moving a document between a document processing system and a document repository in a binary format.

It is another object to provide such a method and system which preserves the properties of a document, in particular, structural information and/or security features, when it is moved.

It is yet another object to ensure a restored document is identical to the original document, i.e. besides the content it must also preserve its original unique identifier.

The above objects are achieved by the features of the independent claims. Advantageous embodiments are subject matter of the subclaims.

From a logical point of view, a document processing system allows reading and writing of single documents, whereas those documents are not physically accessible since they are stored in a sequential binary format. In order to move a single document in its physical representation i.e. the binary format, the invention proposes use of the logical view to obtain all structural information describing the document as well as its content and all meta data. This information will then be used to create an exact copy of that document outside the document processing system.

The invention particularly proposes a native file format to write content such as Lotus Domino notes, that is documents as well as design elements like folders, agents, buttons, etc. to a file. The native file format allows content of a document to be read in binary format and written in a serialized manner to the file. Besides the document content, the file format can store document properties as meta data and, therefore, those properties are preserved during serialization.

Further, the native format allows that a document restored after serialization is assigned its original unique identifier (ID). In the prior art approaches, documents are restored without their original ID, and for that reason, all document links of remote documents pointing to it would dangle.

Browsing a serialized document that was protected originally is impossible with the proposed native format because it stores information in a binary format which is unknown to users.

When a serialized document is restored, a new, empty document is created. Then it is filled up with the items read from the file. All attachments are restored to their original position. From the original attachment descriptor items, new descriptor items are computed.

BRIEF DESCRIPTION OF THE DRAWINGS

In the following, the present invention is described in more detail by way of embodiments from which further features and advantages of the invention become evident. In the drawings.

DETAILED DESCRIPTION OF THE INVENTION

Figure 1:
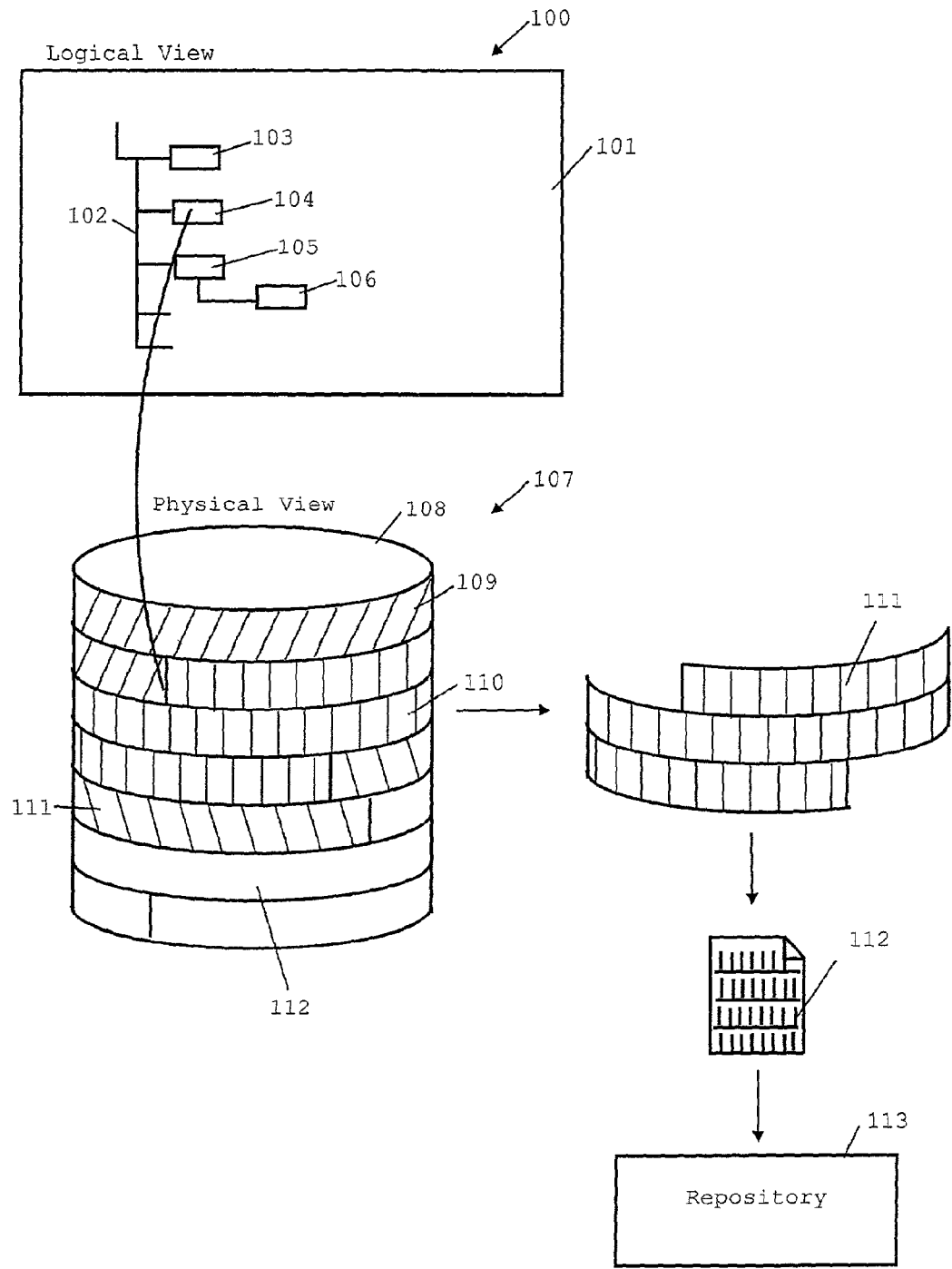
FIG. 1 is a graphical representation of a procedure to move a document from a document processing system to a remote document repository according to the invention.

FIG. 1 shows a logical view 100 on a document processing system 101. It depicts an exemplary tree structure 102 including different branches and documents 103-106. From a physical point of view 107, the documents 103-106 are stored sequentially within a database file 108 as sequential units 109-112, indicated by different patterns.

Due to the nature of the sequential file 108, it is impossible to locate a particular document 104 in that sequential file 108. By gaining access to the document 104 via the logical view 100, an exact copy 111 of the physical representation 110 can be extracted, preserving all structural and meta information, and serialized into a binary file 112. This unreadable binary and therefore secure file 112 is then transferred to a document repository 113.

In Lotus Notes, every peace of content or design element is a "note". For example, emails, agents, actions (buttons), views, folders and script libraries are notes. Internally, all Notes design elements like documents, views, folders, agents, actions, etc, are special subtypes of the basic object type Note. A note basically consists of a number of items which are multivalued containers for typed data. All information that makes up a note is kept in items, except attachments, which are kept in the database itself.

Figure 2:
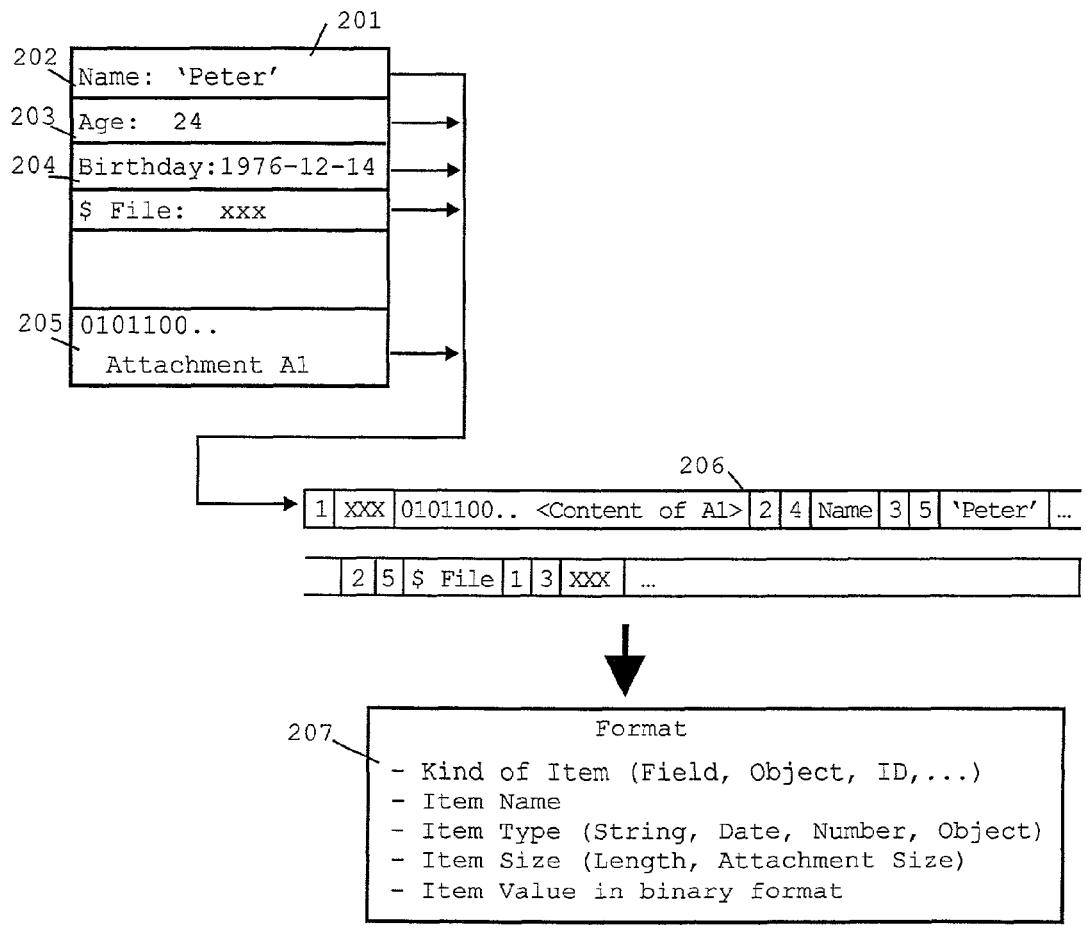
FIG. 2 shows an exemplary document structure for serialization to a file according to the invention.

In FIG. 2 an exemplary document 201 describing a person is shown. The document 201 contains attributes like 'Name'

202, 'Age' 203 and 'Birthday' 204 plus an attachment 205. Both, attributes 202-204 and the attachment 205 are represented by items. The proposed native file format reads the binary item content and writes it in a serialized manner to a file 206. Besides the item content, the native format 207 stores meta information like item type and item length. Since attachments are not stored in items, the note's attachments are read from the database and written to the file 206. Further, the attachment's descriptor item and the note's universal ID (UNID) are written to the file 206.

Figure 3:
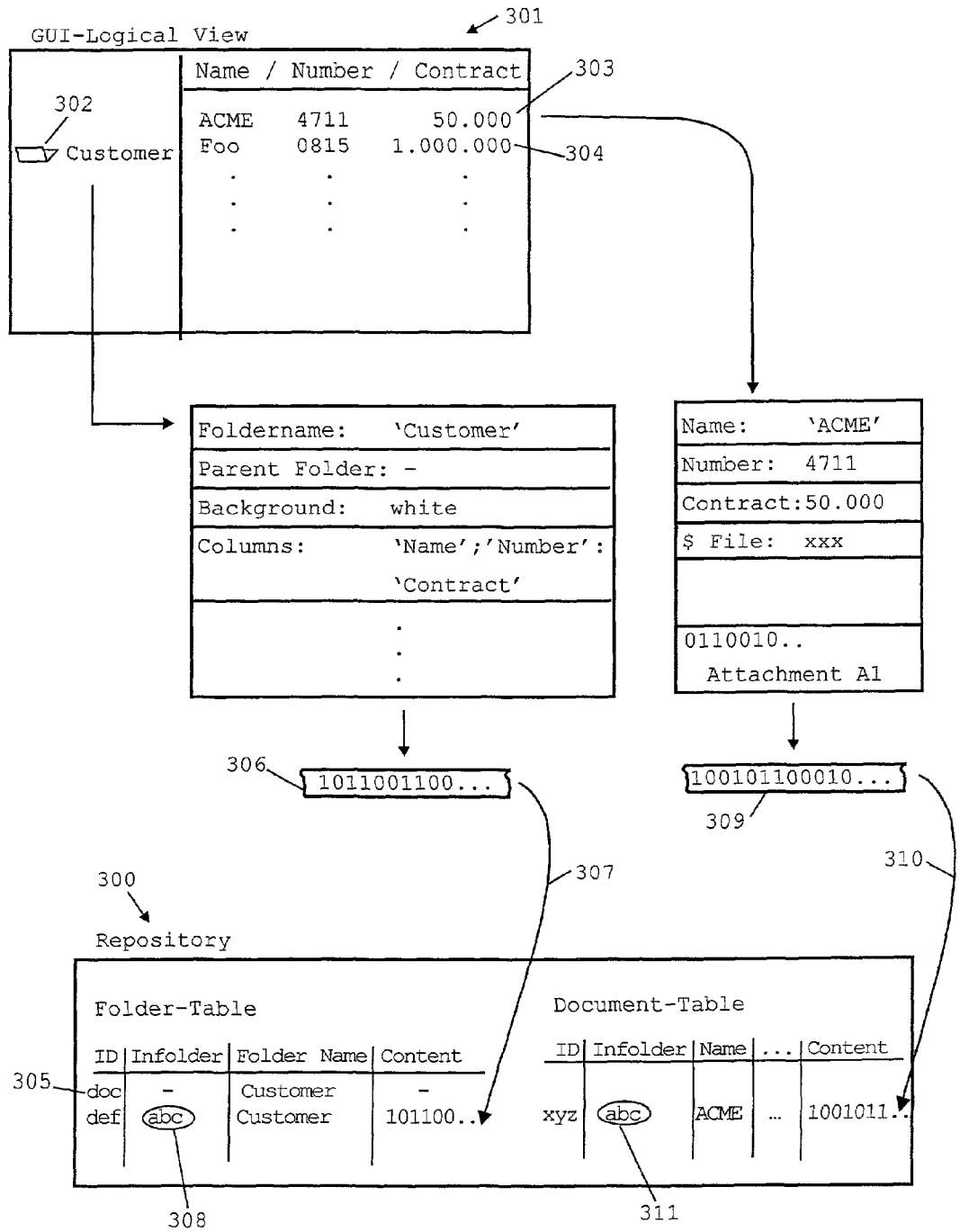
FIG. 3 shows a scenario for serializing design elements by the example of a folder structure, according to the invention.

FIG. 3 shows a scenario for serializing design elements by the example of a folder structure 301, according to the invention.

Within Lotus Notes, documents can be organized in folders. When moving Notes documents to a repository 300 it is important to preserve the folder structure in the repository 300 so that it can be restored upon request. As an example, FIG. 3 shows a 'Customer' folder 302 containing customer documents 303, 304.

Generally, within Lotus Notes all structural elements (documents, folders, agents, etc....) are conceptually based on notes. A note is basically a collection of name-value pairs, so called items, describing the element. When moving the entire Notes folder structure to a repository, this is done in three steps:

1. An entry 305 within the repository 300 is created consisting of the descriptive information for the folder 302 (folder name, folder alias, originating database and archiving user). This entry 305 will later contain references to all the subfolders and documents contained in it. The descriptive information is used to retrieve the folder 302 back by name and to ensure that it can only be restored to its originating database;
2. the Notes folder 302 itself will be serialized into a file 306 and the file 306 be transferred 307 to the repository 300. This way all information making up the folder 302 (like columns to display, included actions, formatting and layout information) will be preserved in the repository 300. A reference 308 to the entry 305 done in 1) is created;
3. all documents 303, 304 contained in the Notes folder 302, including the shown document 303, are also serialized 309 and moved 310 to the repository 300, accordingly. For each of them, a reference 311 to the entry 305 made in 1) is created.

If a folder contained subfolders, for each of them steps 1) to 3) would be executed recursively.

Upon request, a complete folder structure including all its subfolders and notes can either be restored by name or—if at least the empty root folder is left in the Notes database—by archive ID to its originating database, i.e. the database it was originally archived from.

When a folder is requested to be restored, the entry in the repository describing that folder is located (either by its ID or through a search on its name in combination with its originating database). Restoring is then done as follows:
1. The repository entry describing the folder in its native format is identified and first restored back to Notes. This will create a new Notes folder or, if a folder with the same name already exists, it will be replaced;
2. each document referenced in the folder in the repository will be restored back to the folder created in 1).

If a subfolder is found upon restore, steps 1) and 2) are repeated recursively.

In a Lotus Notes environment, the following native format properties are preserved:
serializes a complete note (document, view, folder, agent, action, etc) to a file
restores a note completely from the Notes native format
preserves the note's universal id
preserves attachments and OLE objects
preserves readers fields, author fields, and all other security fields
prevents the data from being browsed in an editor because in "secret" native format
does not preserve signatures as this would be Notes security hole
platforms: all platforms for which the Notes C and/or C++ API exist Finally, it is understood that, although the examples above are described in a Lotus Domino environment, the basic concepts can also be used for other document processing systems like Microsoft™ Exchange™.

The invention claimed is:

1. A method for moving a single document between a document processing system and a document repository, comprising the steps of:
   obtaining structural information describing the structure elements of a sequential file of documents in which the single document is located;
   obtaining meta information describing the properties of the single document;
   obtaining document content of the single document;
   creating a physical representation for the single document based on the obtained structural information, meta information and document content; and
   transferring the created physical representation to the document repository.

2. Method according to claim 1, wherein the physical representation for the single document is a binary format.

3. Method according to claim 1 or 2, further comprising retrieving a document identifier for the moved single document and including the document identifier in the created physical representation.

4. Method according to claim 1, further comprising serializing the obtained structural information, meta information and document content into the physical representation for the document.

5. A computer program product stored on a computer usable medium, comprising computer readable program means for causing a computer to perform a method according to claim 1 when said program is run on said computer.

6. A method for moving a folder and documents contained therein between a document processing system and a document repository, comprising the steps of:
   obtaining structural information describing the folder structure;
   obtaining meta information describing the folder properties;
   creating a physical representation for the folder based on the obtained structural information and meta information; and
   transferring the created physical representation to the document repository.

7. Method according to claim 6 for moving a folder including subfolders, comprising the further step of recursively performing the steps in claim 6 for all subfolders and/or sub-subfolders.

8. Method according to claim 6 or 7, wherein the physical representation for the folder is a binary format.

9. Method according to claim 7, wherein a folder entry contains references to all the subfolders and documents contained in it.

10. Method according to claim 6, further comprising serializing the obtained structural information and meta information into the physical representation for the folder.

11. A system for moving a single document between a document processing system and a document repository, comprising:
   means for obtaining structural information describing the document structure;
   means for obtaining meta information describing the document properties;
   means for obtaining document content;
   means for creating a physical representation for the document based on the obtained structural information, meta information and document content; and
   means for transferring the created physical representation to the document repository.

12. System according to claim 11, comprising means for retrieving the document identifier for the moved document and including the document identifier in the created physical representation.

13. System according to claim 11 or 12, comprising means for serializing the obtained structural information, meta information and document content into the physical representation for the document.

14. A system for moving a folder and documents contained therein between a document processing system and a document repository, comprising:
   means for obtaining structural information describing the folder structure;
   means for obtaining meta information describing the folder properties;
   means for creating a physical representation for the folder based on the obtained structural information and meta information; and
   means for transferring the created physical representation to the document repository.

15. System according to claim 14 for moving a folder including subfolders, further comprising means for recursively performing the steps in claim 14 for all subfolders and/or sub-subfolders.

16. System according to claim 14 or 15, comprising means for serializing the obtained structural information and meta information into the physical representation for the folder.

* * * * *